US012204039B2

(12) United States Patent
Vassilovski et al.

(10) Patent No.: US 12,204,039 B2
(45) Date of Patent: Jan. 21, 2025

(54) APPARATUS AND METHODS FOR SIDELINK-BASED POSITIONING IN UNICAST SESSION

(71) Applicant: QUALCOMM Incorporated, San Diego, CA (US)

(72) Inventors: Dan Vassilovski, Del Mar, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 17/675,816

(22) Filed: Feb. 18, 2022

(65) Prior Publication Data

US 2023/0266423 A1   Aug. 24, 2023

(51) Int. Cl.
| G01S 5/00 | (2006.01) |
| H04W 4/02 | (2018.01) |
| H04W 12/06 | (2021.01) |
| H04W 92/18 | (2009.01) |

(52) U.S. Cl.
CPC ........... *G01S 5/0072* (2013.01); *H04W 4/023* (2013.01); *H04W 12/06* (2013.01); *H04W 92/18* (2013.01)

(58) Field of Classification Search
CPC ..... G01S 5/0072; H04W 4/023; H04W 12/06; H04W 92/18; H04W 4/029; H04W 4/40; H04W 64/006
USPC ...................................................... 455/456.1
See application file for complete search history.

(56) References Cited

U.S. PATENT DOCUMENTS

2023/0062805 A1\*   3/2023   Baek ..................... H04W 64/00

FOREIGN PATENT DOCUMENTS

| WO | 2021133104 A1 | 7/2021 |
| WO | 2022034485 A1 | 2/2022 |

OTHER PUBLICATIONS

Discussion on Unicast Connection Setup Procedure 3GPP Draft; R2-1912161, vol. RAN WG2, no, Chongqung, P. R. China; 2019014-Oct. 18, 2019 Oct. 3, 2019 (Year: 2019).\*
CATT: "Discussion on Unicast Connection Setup Procedure", 3GPP TSG-RAN WG2 Meeting #107bis, R2-1912161 (Revision of R2-1908737), 3rd Generation Partnership Project (3GPP), Mobile Competence Centre, 650, Route Des Lucioles, F-06921 Sophia-Antipolis Cedex, France, vol. RAN WG2, No. Chongqing, P.R. China, Oct. 14, 2019-Oct. 18, 2019, 9 Pages, Oct. 3, 2019, XP051803776, figure 2.
International Search Report and Written Opinion—PCT/US2023/010144—ISA/EPO—May 2, 2023.

\* cited by examiner

*Primary Examiner* — Tanmay K Shah
(74) *Attorney, Agent, or Firm* — Thien T. Nguyen

(57) ABSTRACT

A sidelink-based positioning session is initiated by a user equipment (UE) with an indication that the positioning session will be a unicast session using a single protocol design that supports both Long-Term Evolution (LTE) and New Radio deployments. An initiator UE may provide an explicit indication to a target UE that the sidelink positioning session will be unicast using a unicast flag in an initial sidelink positioning initiation message or in a direct link establishment request message. The initiator UE may provide an implicit indication to a target UE that the sidelink positioning session will be unicast by initiating an Authentication & Security procedure, e.g., by sending a direct link authentication request, after sending the initial sidelink positioning initiation message.

28 Claims, 7 Drawing Sheets

APPARATUS AND METHODS FOR SIDELINK-BASED POSITIONING IN UNICAST SESSION

BACKGROUND

Background Field

The subject matter disclosed herein relates to wireless communications systems, and more particularly to methods and apparatuses for location determination of a user equipment in a distributed wireless communications system.

Relevant Background

Obtaining accurate position information for user equipment, such as cellular telephones or other wireless communication devices, is becoming prevalent in the communications industry. For example, obtaining highly accurate locations of vehicles or pedestrians is essential for autonomous vehicle driving and pedestrian safety applications.

A common means to determine the location of a device is to use a satellite positioning system (SPS), such as the well-known Global Positioning Satellite (GPS) system or Global Navigation Satellite System (GNSS), which employ a number of satellites that are in orbit around the Earth. In certain scenarios, however, location determination signals from an SPS may be unreliable or unavailable, e.g., during adverse weather conditions or in areas with poor satellite signal reception such as tunnels or parking complexes. Moreover, position information generated using SPS is prone to imprecision. For example, off-the-shelf GPS positioning devices have an accuracy of a few meters, which is not optimal to ensure safe autonomous driving and navigation.

Coordinated or automated driving requires communications between vehicles, which may be direct or indirect, e.g., via an infrastructure component such as a roadside unit (RSU). For vehicle safety applications, positioning and ranging are important. For example, vehicle user equipments (UEs) may perform positioning and ranging using sidelink signaling, e.g., broadcasting ranging signals for other vehicle UEs or pedestrian UEs to determine the relative location of the transmitter. An accurate and timely knowledge of the relative locations or ranges to nearby vehicles, enables automated vehicles to safely maneuver and negotiate traffic conditions. Round trip time (RTT), for example, is a technique commonly used for determining a range between transmitters. RTT is a two-way messaging technique in which the time between sending a ranging signal from a first device to receiving an acknowledgement (e.g., in the form of return ranging signal) from a second device (minus processing delays) corresponds to the distance (range) between the two devices.

During a positioning session messages may need to be exchanged between participating UEs in sidelink communications. The various participating UEs, however, may employ different technologies. Accordingly, improvements are desirable to enable positioning with participating UEs that employ different technologies.

SUMMARY

A sidelink-based positioning session is initiated by a user equipment (UE) with an indication that the positioning session will be a unicast session using a single protocol design that supports both Long-Term Evolution (LTE) and New Radio deployments. An initiator UE may provide an explicit indication to a target UE that the sidelink positioning session will be unicast using a unicast flag in an initial sidelink positioning initiation message or in a direct link establishment request message. The initiator UE may provide an implicit indication to a target UE that the sidelink positioning session will be unicast by initiating an Authentication & Security procedure, e.g., by sending a direct link authentication request, after sending the initial sidelink positioning initiation message.

In one implementation, a method of sidelink positioning performed by an initiator user equipment (UE), the method includes sending a first message with a positioning session request to a target UE to initiate a sidelink positioning session with the target UE; providing an indication to the target UE that the sidelink positioning session will be a unicast session prior to engaging in the sidelink positioning session with the target UE; sending one or more messages to the target UE to establish a sidelink unicast link with the target UE; and engaging in the sidelink positioning session with the target UE.

In one implementation, an initiator user equipment (UE) configured for sidelink positioning includes a wireless transceiver configured to wirelessly communicate with entities in a wireless network; at least one memory; and at least one processor coupled to the wireless transceiver and the at least one memory, wherein the at least one processor is configured to: send, via the wireless transceiver, a first message with a positioning session request to a target UE to initiate a sidelink positioning session with the target UE; provide an indication to the target UE that the sidelink positioning session will be a unicast session prior to engaging in the sidelink positioning session with the target UE; send, via the wireless transceiver, one or more messages to the target UE to establish a sidelink unicast link with the target UE; and engage in the sidelink positioning session with the target UE.

In one implementation, an initiator user equipment (UE) configured for sidelink positioning, includes means for sending a first message with a positioning session request to a target UE to initiate a sidelink positioning session with the target UE; means for providing an indication to the target UE that the sidelink positioning session will be a unicast session prior to engaging in the sidelink positioning session with the target UE; means for sending one or more messages to the target UE to establish a sidelink unicast link with the target UE; and means for engaging in the sidelink positioning session with the target UE.

In one implementation, a non-transitory storage medium including program code stored thereon, the program code is operable to configure at least one processor in an initiator user equipment (UE) for sidelink positioning, the program code comprising instructions to: send a first message with a positioning session request to a target UE to initiate a sidelink positioning session with the target UE; provide an indication to the target UE that the sidelink positioning session will be a unicast session prior to engaging in the sidelink positioning session with the target UE; send one or more messages to the target UE to establish a sidelink unicast link with the target UE; and engage in the sidelink positioning session with the target UE.

In one implementation, a method of sidelink positioning performed by a target user equipment (UE), the method includes receiving a first message from an initiator UE to initiate a sidelink positioning session with the initiator UE; receiving an indication from the initiator UE that the sidelink positioning session will be a unicast session prior to engaging in the sidelink positioning session with the initiator UE; receiving one or more messages from the initiator UE to establish a sidelink unicast link with the initiator UE; and engaging in the sidelink positioning session with the initiator UE.

In one implementation, a target user equipment (UE) configured for sidelink positioning includes a wireless transceiver configured to wirelessly communicate with entities in a wireless network; at least one memory; and at least one processor coupled to the wireless transceiver and the at least one memory, wherein the at least one processor is configured to: receive, via the wireless transceiver, a first message from an initiator UE to initiate a sidelink positioning session with the initiator UE; receive an indication from the initiator UE that the sidelink positioning session will be a unicast session prior to engaging in the sidelink positioning session with the initiator UE; receive, via the wireless transceiver, one or more messages from the initiator UE to establish a sidelink unicast link with the initiator UE; and engage in the sidelink positioning session with the initiator UE.

In one implementation, a target user equipment (UE) configured for sidelink positioning, includes means for receiving a first message from an initiator UE to initiate a sidelink positioning session with the initiator UE; means for receiving an indication from the initiator UE that the sidelink positioning session will be a unicast session prior to engaging in the sidelink positioning session with the initiator UE; means for receiving one or more messages from the initiator UE to establish a sidelink unicast link with the initiator UE; and means for engaging in the sidelink positioning session with the initiator UE.

In one implementation, a non-transitory storage medium including program code stored thereon, the program code is operable to configure at least one processor in target user equipment (UE) for sidelink positioning, the program code comprising instructions to: receive a first message from an initiator UE to initiate a sidelink positioning session with the initiator UE; receive an indication from the initiator UE that the sidelink positioning session will be a unicast session prior to engaging in the sidelink positioning session with the initiator UE; receive one or more messages from the initiator UE to establish a sidelink unicast link with the initiator UE; and engage in the sidelink positioning session with the initiator UE.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Figure 1:
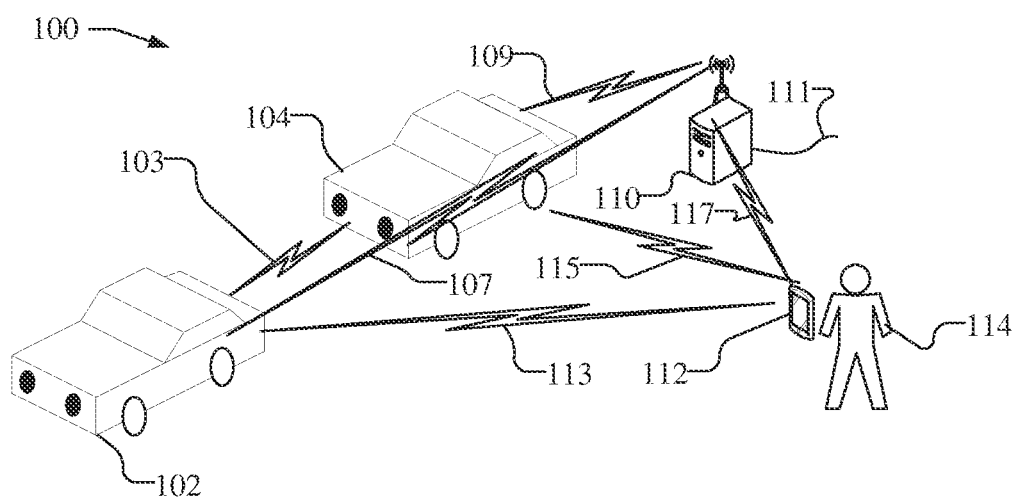
FIG. 1 illustrates a wireless communication system illustrating distributed communications, including signaling to support sidelink-based positioning.

A distributed approach may be used for ranging and positioning of vehicles, roadside units (RSU), and pedestrian and may avoid the need for a centralized base station to coordinate and relay communications. Such communications may be used, for example, for automated driving and vehicle safety applications. Communications used in a distributed approach may be made directly, e.g., between vehicles, or between vehicles and a RSU or pedestrian. These communications may include messages and information elements (IEs) with which a vehicle may provide information necessary for automated driving and safety.

For example, for safe operation of autonomous vehicles, the relative locations or ranges to other vehicles needs to be determined. Various approaches may be used to derive the relative positions between vehicles. For example, relative positions of vehicles may be derived using ranging signaling. Ranging signals are sometimes referred to as physical ranging signals, positioning ranging signals, positioning reference signals, or physical referencing signals, and may be collectively referred to herein as PRS signals. PRS signals, for example, may be broadcast by a user equipment (UE) in a vehicle and received by other UEs and/or infrastructure, e.g., RSU, or UEs held by a pedestrian, using direct communication systems, such as dedicated short-range communication (DSRC), cellular Vehicle-to-Everything (C-V2X) communication, such as Long-Term Evolution (LTE) V2X and even 5G New Radio (NR) V2X communications. PRS signals are used to determine a range to the broadcasting vehicle, e.g., using one way ranging, round-trip-time (RTT) positioning operations, or other standard positioning operations such as time of arrival (TOA), time difference of arrival (TDOA) or observed time difference of arrival (OTDOA).

In a distributed system, an individual UE is able to range with respect to other UEs that are nearby using messages and positioning signals that are transmitted directly between UEs, sometimes referred to as sidelink-based positioning. Sidelink-based positioning enables determination of relative distance and absolute position between sidelink-capable devices. The use of sidelink-based positioning, for example, is useful in situations where GNSS is degraded or unavailable (tunnels, urban canyons, etc.) and may also be used to enhance range and position accuracy when GNSS is available. Sidelink-based positioning, for example, is expected to be used over both LTE V2X and NR V2X deployments. LTE V2X and NR V2X will have contemporaneous deployments for years to come, and sidelink-based positioning will be used on both technologies. These two technologies, however, differ in their lower layers. For example, LTE V2X supports broadcast transmission, while NR V2X supports broadcast, groupcast and unicast transmissions.

A sidelink positioning upper-layer signaling protocol design supporting broadcast will work for both LTE V2X and NR V2X, i.e., will work on devices based on chipsets from either technology. For NR connectionless and managed groupcast, the lower layers provide an indication of the cast type based on upper-layer provided distance and group membership, respectively, as specified by the Third Generation Partnership Project (3GPP). For NR unicast, 3GPP defines separate PC5 sidelink signaling (PC5-S) and PC5 Radio Resource Control signaling (PC5-RRC), initiated based on a broadcast Direct Link Establishment Request. While support for NR unicast transport may be accomplished through separate LTE V2X and NR V2X upper-layer signaling protocol designs, each deployed on their respective technology, this would require separate implementations for the separate technologies. It is preferable to implement a single protocol design that supports both LTE and NR broadcast, and is able to exercise NR groupcast and unicast, as this would advantageously obviate the need for separate, technology-specific upper-layer designs, and enable a solution that migrates easily from LTE V2X to NR V2X.

Accordingly, in an implementation, as discussed herein, an initiator UE may initiate a sidelink-based positioning session with a target UE using an indication that the sidelink positioning session will be a unicast session prior to engaging in the sidelink positioning session with the target UE. The initiator UE, for example, may send a first message to initiate a sidelink positioning session with a target UE, and provide the indication that the sidelink positioning session will be a unicast session. The initiator UE may send one or more messages to the target UE to establish a sidelink unicast link with the target UE and then engage in the sidelink positioning session with the target UE. In one implementation, the initiator UE may provide an explicit indication that the sidelink positioning session will be a unicast session in the first message, e.g., using a unicast session flag. In one implementation, the initiator UE may provide an implicit indication that the sidelink positioning session will be a unicast session by sending a second message to the target UE to initiate an authentication and security procedure, e.g., as part of the messaging to establish the sidelink unicast link. The second message, for example, may include a direct link authentication request. In an implementation where the second message is used to implicitly indicate that the sidelink positioning session will be a unicast session, a direct link establishment request to the target UE to establish the sidelink unicast link is obviated.

FIG. 1 illustrates a wireless communication system 100 illustrating distributed communications, including signaling to support sidelink-based positioning, as described herein. Wireless communication system 100 illustrates a first vehicle 102 with a first wireless device, sometimes referred to as an On-Board Unit (OBU) or UE 102, in wireless communications with another OBU/UE 104, illustrated as a second vehicle. It should be understood that the wireless devices 102 and 104 are illustrated as vehicles, and are sometimes referred to as OBUs, the wireless devices are not limited to OBUs in vehicles or subsystem thereof, and may be referred to generally herein as vehicles 102 and 104, OBUs 102 and 104, or UEs 102 and 104. The first UE 102 and second UE 104, for example, may be two vehicles traveling on a road along with other vehicles, not illustrated.

The wireless communication system 100 may use, e.g., Vehicle-to-Everything (V2X) communication standard, in which information is passed between a vehicle and other entities within the wireless communication network. The V2X services include, e.g., services for Vehicle-to-Vehicle (V2V), Vehicle-to-Pedestrian (V2P), Vehicle-to-Infrastructure (V2I), and Vehicle-to-Network (V2N). The V2X standard aims to develop autonomous or semi-autonomous driving systems, such as Advanced Driver Assistance System (ADAS), which helps drivers with critical decisions, such as lane changes, speed changes, overtaking speeds, and may be used to assist in parking as discussed herein.

In general, there are two modes of operation for V2X services, as defined in Third Generation Partnership Project (3GPP) TS 23.285. One mode of operation uses direct wireless communications between V2X entities, which may sometimes be referred to as sidelink communication. The other mode of operation uses network based wireless communication between entities. The two modes of operation may be combined, or other modes of operation may be used if desired.

The wireless communication system 100 may operate using direct or indirect wireless communications between the UE 102 and UE 104. For example, the wireless communication may be over, e.g., Proximity-based Services (ProSe) Direction Communication (PC5) reference point as defined in 3GPP TS 23.303, and may use wireless communications under IEEE 1609, Wireless Access in Vehicular Environments (WAVE), Intelligent Transport Systems (ITS), and IEEE 802.11p, on the ITS band of 5.9 GHz, or other wireless connections directly between entities. The V2X communications may use 3GPP defined LTE V2X or NR V2X communications.

Thus, as illustrated, UE 102 and UE 104 may directly communicate using with a Vehicle-to-Vehicle (V2V) communication link 103. UE 102 and UE 104 may similarly directly communicate with roadside unit (RSU) 110 via Vehicle-to-Infrastructure (V2I) communication links 107 and 109, respectively. The RSU 110 may include a backhaul connection to a network, illustrated by wired connection 111, but may via a wireless Uu interface to a base station. The RSU 110, for example, may be a stationary infrastructure entity, that may support V2X applications and that can exchange messages with other entities supporting V2X applications. An RSU may be a logical entity that may combine V2X application logic with the functionality of base stations in a RAN, such as an eNB, ng-eNB, or eLTE (referred to as eNB-type RSU) or a gNB, or UE (referred to as UE-type RSU). The RSU 110 may be used for ranging with UEs 102, 104, or other UEs, and because the position of the RSU 110 may be known precisely, the RSU 110 may be used as an anchor UE with which a position of the UE 102, 104 or other UEs may be determined. The RSU 110 may sometimes be referred to herein as UE 110. The UEs 102, 104 and UE 110 may communicate with additional entities, such as additional vehicles, RSUs or with a UE 112 held by pedestrian 114 using direct communication links. For example, UE 102 may communicate with UE 112 via V2V communication link 113, UE 104 may communicate with UE 112 via V2V communication link 115, and UE 110 may communicate with UE 112 via V2I communication link 117.

During direct communications with one or more entities in the V2X wireless communication system 100, each entity may provide V2X information, such as an identifier for the V2X entity, as well as other information in messages such as Common Awareness Messages (CAM) and Decentralized Notification Messages (DENM) or Basic Safety Message (BSM), which may be used for, e.g., ADAS or safety use cases.

In other implementations, UE 102 and UE 104 may indirectly communicate with each other, e.g., through the RSU 110 via the V2I communication links 107 and 109, respectively or through other network infrastructure (not shown), e.g., using cellular vehicle-to-everything (CV2X).

For example, vehicles may communicate via a base station in a Radio Access Network (RAN), such as an evolved Node B (eNB) or next generation evolved Node B (ng-eNB) in LTE wireless access and/or evolved LTE (eLTE) wireless access or a NR Node B (gNB) in Fifth Generation (5G) wireless access.

Sidelink (SL) positioning is a ranging exercise between two or more UEs based on RTT measurements of wideband PRS. Each UE reports a measured RTT to all other participating UEs, along with its location (if known) For UEs having zero or inaccurate knowledge of their position, the RTT yields an inter-UE range. If one UE has an accurate knowledge of its position (e.g., the UE is an RSU), the position may be used with the range to yield an absolute position. The session initiator UE may determine the session cast type (e.g., unicast, groupcast, or broadcast).

Thus, either UE 102 or UE 104 may initiate the positioning session. During the sidelink-based positioning, the UEs 102 and 104 may send a number of signals, such as prePRS messages, broadcasting PRS, and sending postPRS messages on links 103, 107, 109, 113 or 115, with which the range or relative positions between UEs 102 and 104 may be determined. The PRS broadcast by UEs 102 and 104 may be any signal suitable for positioning, e.g., as defined for DSRC or C-V2X. The PRS may be broadcast on a licensed or an unlicensed spectrum. For example, in some implementations, PRS may be broadcast on one or more Unlicensed National Information Infrastructure (UNIT) radio bands including, for example, one or more of the UNII-1 radio band, the UNII-2A radio band, the UNII-2B radio band, or the UNII-3 radio band. When broadcasting on unlicensed spectrum, listen-before-transmit (LBT) protocols may be employed.

Where UEs 102 and 104 broadcast PRS in a V2V link 103, the range or relative positions between UEs 102 and 104 may be determined directly. Where UE 102 and 104 broadcast PRS in V2I links 107 and 109 or via links 113 and 115, the range or relative positions between UE 102 and UE 110 or UE 112 and between UE 104 and UE 110 or UE 112 may be determined directly.

The signaling sent during the sidelink-based positioning, e.g., including positioning session establishment and post-positioning measurement, should be a single design allowing broadcast transmission (LTE V2X and NR V2X) and groupcast or unicast transmission (NR V2X), as this would advantageously obviate the need for separate, technology-specific upper-layer designs, and enable a solution that migrates easily from LTE V2X to NR V2X.

Accordingly, as discussed herein, in one implementation, an initiator UE may initiate a sidelink-based positioning session with a target UE using an explicit or implicit indication that the sidelink positioning session will be a unicast session prior to engaging in the sidelink positioning session with the target UE. The indication, for example, may be an explicit indication that the sidelink positioning session will be a unicast session that may be provided in an initial message to initiate a sidelink positioning session. In another example, the indication may be an implicit indication that the sidelink positioning session will be a unicast session, e.g., based on the initiation of an authentication and security procedure to establish the sidelink unicast link.

Figure 2A:
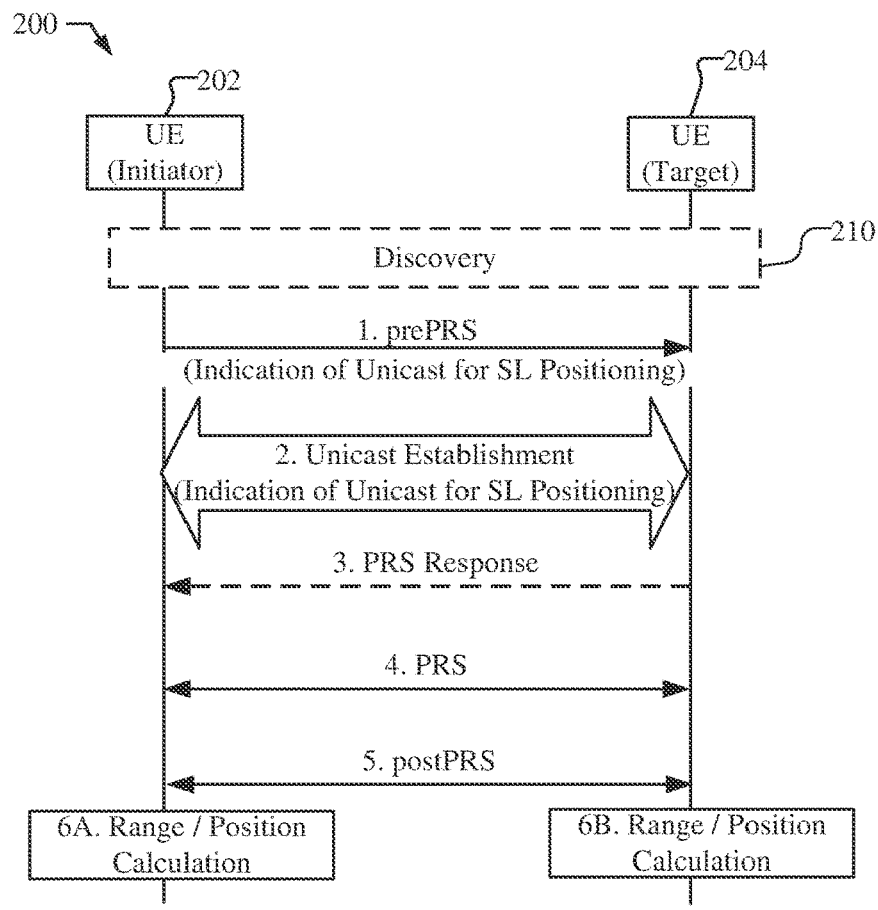
FIG. 2A illustrates a signaling flow between two UEs for sidelink (SL) positioning using unicast transmission.

FIG. 2A, by way of example, illustrates a signaling flow 200 between two UEs, e.g., an initiator UE 202 and a target UE 204, for sidelink (SL) positioning using unicast transmission. The initiator UE 202 and the target UE 204 may be, e.g., any of UEs 102, 104, 110, and 112 shown in FIG. 1, or other wireless devices.

As illustrated at block 210, an optional discover process may be implemented, e.g., to identify UEs that are available for sidelink positioning. The discover process may be request-response or announcement based.

At stage 1, the initiator UE 202 may broadcast a first message to initiate the sidelink positioning procedure, sometimes referred to as a prePRS message. The prePRS message, for example, may request a positioning session with target UE 204. The pre-PRS message may be transmitted on a licensed spectrum. The prePRS message may include identifiers of responder UEs included in the ranging session (e.g., obtained from preceding capabilities messages (not shown)), as well as signal information to be used in the ranging session by the initiator UE 202 and in some implementations by the target UE 204, such as PRS resources, including PRS bandwidth or channel and timing instances, and PRS identifier (ID). In some implementations, the prePRS message may include an indication that the cast type will be unicast for the sidelink positioning session. For example, the indication may be explicit with the prePRS message including "Unicast Session" flag. The presence of the flag alerts the target UE 204 that the session will be unicast. In some implementations, the presence of the flag alerts the target UE 204 that a 3GPP unicast call establishment procedure (stage 2) will follow, which may include a Direct Communication Request (DCR), sometimes referred to as a direct link establishment request, as well as a direct authentication request and/or direct security mode command). In some implementations, after sending a prePRS message in stage 1 with a unicast flag, the 3GPP unicast call establishment (in stage 2) may begin with a DCR (direct link establishment request message). In some implementations, after sending the prePRS message in stage 1 with a unicast flag, the 3GPP unicast call establishment (in stage 2) may skip the transmission of the DCR (direct link establishment request message). Moreover, in some implementations, the prePRS message in stage 1 may omit the unicast flag, and the 3GPP unicast call establishment (in stage 2) may skip the transmission of the DCR (direct link establishment request message).

At stage 2, unicast call establishment messages are exchanged between the initiator UE 202 and the target UE 204. The unicast call establishment messages exchanged may follow 3GPP-defined procedures. In some implementations, the unicast call establishment messages may include an indication that the cast type will be unicast for the sidelink positioning session. For example, as discussed above, in some implementations, a DCR (direct link establishment request message) sent by the initiator UE 202 in the unicast call establishment messages may serve as an explicit indication that the sidelink positioning session cast type will be unicast. In an implementation where the prePRS message from stage 1 includes an explicit indication that the cast type will be unicast, the unicast call establishment message may not include a direct link establishment request. In some implementations, the unicast call establishment messages may include an implicit indication that the sidelink positioning session cast type will be unicast, e.g., based on the fact that after broadcasting the prePRS message in stage 1, the initiator UE 202 initiates a unicast establishment procedure with the target UE 204, e.g., by initiating an authentication and security procedure. The receipt by the target UE 204 of a unicast call establishment message, e.g., a Direct Authentication Request message, from the initiator UE 202, provides an implicit indication of the unicast session establishment. In an implementation, where the indication is implicit in the unicast call establishment messages, the unicast call establishment message may not include a direct link establishment request, e.g., because the prePRS message in stage 1 has already been sent by the initiator UE 202, thereby reducing the number of messages required for unicast call establishment.

At stage 3, which may be optional, the target UE 204 may respond via unicast to the initial prePRS message from stage 1, e.g., in a PRS response message. The PRS response message, for example, may acknowledge the initiating prePRS message from stage 1 and may provide signaling information, such as the PRS bandwidth or channel that will be used by the target UE 204. The PRS response messages may additionally indicate whether the target UE 204 is requesting its position or if it knows its position and may serve as an anchor UE for the sidelink-based positioning. In some implementations, the target UE 204 may provide an indication of whether it needs to determine its position or if it knows its position and may serve as an anchor UE in a capabilities message (not shown). The PRS response messages of stage 3 may be transmitted on a licensed spectrum.

At stage 4, the ranging signals (PRS signals) are broadcast by the initiator UE 202 and target UE 204. The PRS signal may be broadcast on an unlicensed spectrum in order to use a wide frequency band. It should be understood that the initiator UE 202 and target UE 204 may broadcast PRS signals at different times, e.g., with the first PRS signal being broadcast by the initiator UE 202, followed by a PRS signal broadcast by the target UE 204, e.g., based on LBT constraints if the PRS signals are broadcast on an unlicensed spectrum. Each broadcasting UE records the ToD of the broadcast PRS signal and in some implementations the AoD of the PRS signal and each receiving UE records the ToA of each received PRS signal and in some implementations the AoA of each received PRS signal.

At stage 5, post positioning measurements may be unicast by the initiator UE 202 and the target UE 204, respectively, which may be referred to as postPRS messages. The postPRS messages, for example, may be transmitted on a licensed spectrum. The postPRS messages from each UE may indicate the ToD, and in some implementations the AoD, of the PRS signal broadcast by the UE and may further indicate the ToA, and in some implementations the AoA, of each PRS signal received by the UE. The post-PRS messages may further include, if known, the location of the UE, the orientation of UE, a broadcast indicator of the UE PRS, a reception indicator of PRS of the other UEs, as well as other related measurements, e.g., including map information, the locations of reflectors with respect to the UE, etc.

At stage 6A, the initiator UE 202 may determine the range between itself and the target UE 204 based on the ToD and ToA of the PRS signals broadcast in stage 4 as measured by the initiator UE 202 and the measurements received in the postPRS message in stage 5. For example, the range may be determined based on the $ToD_i$ and $ToA_i$ for the $PRS_i$ signals (where i=1 for PRS broadcast by the initiator UE 202 and i=2 for PRS broadcast by the target UE 204) as (where c represents the speed of transmission of an electromagnetic wave, e.g., speed of light):

$$\text{Range} = \frac{(ToD_1 - ToA_2) - (ToA_1 - ToD_2)}{2c}. \quad \text{eq. 1}$$

The initiator UE 202 may determine its estimated position and associated accuracy level using the determined range (along with other ranges determined for other target UEs) and the location information received from anchor UEs in the postPRS message in stage 5. The estimated position may be further based on additional information, such as AoA or AoD of the PRS signals, or geographic information, such as street locations. The position of the initiator UE 202, for example, may be determined using, e.g., multilateration and constraints pursuant to the AoA or AoD of the PRS signals and geographic information.

At stage 6B, the target UE 204 may determine the range and position between itself and the initiator UE 202, in a manner similar to stage 6A.

Figure 2B:
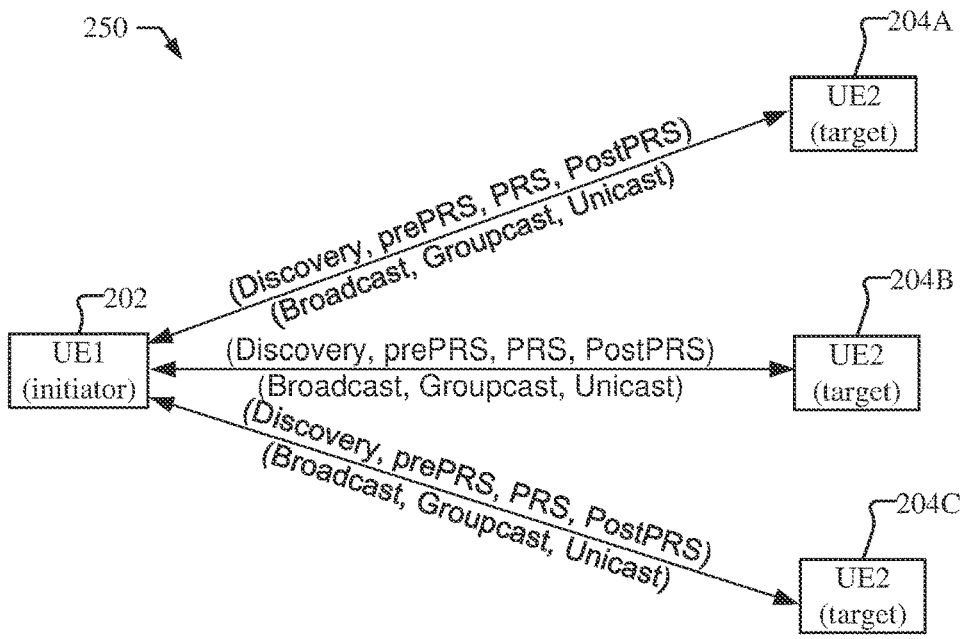
FIG. 2B illustrates an environment in which the initiator UE and multiple target UEs are engaged in a sidelink positioning procedure.

FIG. 2B, by way of example, illustrates an environment 250 in which the initiator UE 202 and multiple target UEs 204A, 204B, and 204C (sometimes collectively referred to as target UEs 204) are engaged in a sidelink positioning procedure. The initiator UE 202 and one or more of the target UEs 204 may perform sidelink-based positioning procedure using broadcast, groupcast or unicast. The unicast procedure for any or all of the target UEs 204, for example, may be performed as discussed in FIG. 2A. The initiator UE 202, for example, may broadcast in the prePRS message (in stage 1 of FIG. 2A) a listing of target UEs after the optional discovery process (block 210). Each of the initiator UE 202 and target UEs 204 broadcast N-1 measurements (where N is the total number of UEs) results in the postPRS message (in stage 5 of FIG. 2A) enabling an RTT calculation by each UE.

Figure 3:
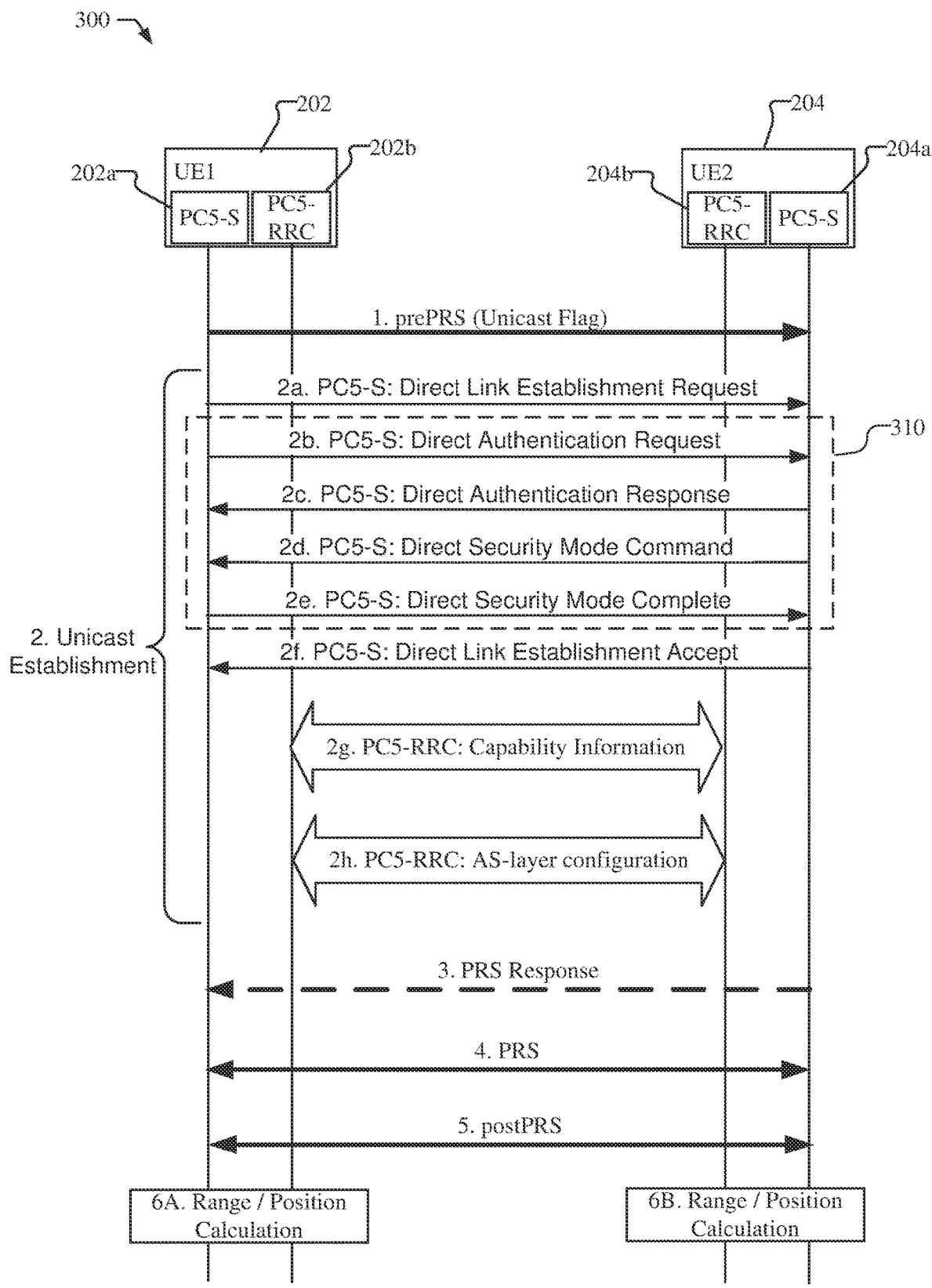
FIG. 3 illustrates a signaling flow between two UEs for sidelink positioning with an explicit indication of unicast link session establishment using broadcast NR PC5-S.

FIG. 3, by way of example, illustrates a signaling flow 300 between two UEs, e.g., the initiator UE 202 and a target UE 204, for sidelink positioning using broadcast NR PC5-S. Signaling flow 300 is similar to the signaling flow 200 shown in FIG. 2A and illustrates an explicit indication of unicast link session establishment. Signaling flow 300 does not illustrate the discovery process 210 shown in FIG. 2A, which may be included in some implementations. The initiator UE 202 and the target UE 204 may be, e.g., any of UEs 102, 104, 110, and 112 shown in FIG. 1, or other wireless devices. As illustrated, the initiator UE 202 includes a chipset for PC5-S 202a and PC5-RRC 202b, and the target UE 204 includes a chipset for PC5-S 204a and PC5-RRC 204b. In some implementations, the UE 202 may include a single chipset encompassing PC5-S and PC5-RRC, as well as other communication aspects.

At stage 1, the initiator UE 202 may broadcast via PC5-S a first message (prePRS) to initiate the sidelink positioning procedure. The prePRS message, for example, may request a positioning session with target UE 204. The prePRS message of stage 1 of signaling flow 300 may be the same as the prePRS message of stage 1 of signaling flow 200 shown in FIG. 2A. For example, the prePRS message may include identifiers of responder UEs included in the ranging session (e.g., obtained from preceding capabilities messages (not shown)), as well as signal information to be used in the ranging session by the initiator UE 202 and in some implementations by the target UE 204, such as PRS resources, including PRS bandwidth or channel and timing instances, and PRS identifier (ID). As illustrated in FIG. 3, in some implementations, the prePRS message includes an explicit indication that the cast type will be unicast for the sidelink positioning session, such as a "Unicast Session" flag. The presence of flag alerts the target UE 204 that the sidelink-based positioning session will be unicast. In some implementations, the presence of flag alerts the target UE 204 that the next transmission from the initiator UE 202 will be for authentication and security establishment (e.g., a direct authentication request and/or direct security mode command), and that a direct link establishment request will not be sent by the initiator UE 202.

Stage 2 illustrates the unicast session establishment, which may follow 3GPP-defined procedures. Stage 2, for example, includes messages sent via PC5-S(stages 2a -20 and message exchanges sent via PC5-RRC (stage 2g and 2h).

At stage 2a, the initiator UE 202 sends a direct link establishment request message that is received by the target UE 204. The direct link establishment request may be part of a standard 3GPP unicast call establishment used for unicast call initiation. As discussed above, the initiator UE 202 may advise the target UE 204 that the SL positioning session being initiated will be transacted over a unicast link, which may be accomplished using the prePRS message with a unicast flag, as shown in stage 1, followed by the 3GPP unicast call establishment, e.g., beginning with the direct link establishment request message shown in stage 2a. In some implementations, the initiator UE 202 may advise the target UE 204 that the SL positioning session being initiated will be transacted over a unicast link using the prePRS message with a unicast flag, as shown in stage 1, followed by transmission of the security related messages illustrated by block 310, e.g., skipping the transmission of the direct link establishment request message shown in stage 2a. Moreover, in some implementations, the initiator UE 202 may advise the target UE 204 that the SL positioning session being initiated will be transacted over a unicast link using the prePRS message without the unicast flag followed by transmission of the security related messages illustrated by block 310, e.g., skipping the transmission of the direct link establishment request message shown in stage 2a. The omission of the direct link establishment request message reduces the message count resulting in reduced session establishment time.

Block 310 illustrates Authentication & Security Procedures, including stages 2b-2e.

At stage 2b, the initiator UE 202 sends a Direct Authentication Request (sometimes referred to as a direct link authentication request) message that is received by the target UE 204.

At stage 2c, the target UE 204 sends a Direct Authentication Response message that is received by the initiator UE 202.

At stage 2d, the target UE 204 sends a Direct Security Mode Command message that is received by the initiator UE 202.

At stage 2e, the initiator UE 202 sends a Direct Security Mode Complete message that is received by the target UE 204.

After the Authentication & Security Procedures of block 310, at stage 2f the target UE 204 sends a Direct Link Establishment Accept message that is received by the initiator UE 202.

At stage 2g, a capability information message exchange sent via PC5-RRC is performed. For example, the initiator UE 202 sends its capability information to the target UE 204 and receives capability information from the target UE 204, and vice versa, the target UE 204 sends its capability information to the initiator UE 202 and receives capability information from the initiator UE 202.

At stage 2h, an Access Stratum (AS)-layer configuration message exchange sent via PC5-RRC is performed between the initiator UE 202 and the target UE 204.

At stage 3, which may be optional, the target UE 204 may respond (PRS response message) via unicast to the initial prePRS message from stage 1. The PRS response message, for example, may acknowledge the initiating prePRS message from stage 1. The PRS response message of stage 3 of signaling flow 300 may be the same as the PRS response message of stage 3 of signaling flow 200 shown in FIG. 2A. For example, the PRS response message may provide signaling information, such as the PRS bandwidth or channel that will be used by the target UE 204, and may additionally indicate whether the target UE 204 is requesting its position or if it knows its position and may serve as an anchor UE for the sidelink-based positioning. In some implementations, the target UE 204 may provide an indication of whether it needs to determine its position or if it knows its position and may serve as an anchor UE in a capabilities message (not shown).

At stage 4, the ranging signals (PRS signals) are transmitted via PC5-S by the initiator UE 202 and target UE 204. The PRS of stage 4 of signaling flow 300 may be the same as the PRS of stage 3 of signaling flow 200 shown in FIG. 2A. For example, the PRS may be broadcast on an unlicensed spectrum in order to use a wide frequency band. The initiator UE 202 and target UE 204 may broadcast PRS signals at different times, e.g., with the first PRS signal being broadcast by the initiator UE 202, followed by a PRS signal broadcast by the target UE 204, e.g., based on LBT constraints if the PRS signals are broadcast on an unlicensed spectrum. Each broadcasting UE records the ToD of the broadcast PRS signal and in some implementations the AoD of the PRS signal and each receiving UE records the ToA of each received PRS signal and in some implementations the AoA of each received PRS signal.

At stage 5, post positioning measurements (postPRS messages) may be unicast by the initiator UE 202 and the target UE 204, respectively. The postPRS messages of stage 5 of signaling flow 300 may be the same as the postPRS messages of stage 5 of signaling flow 200 shown in FIG. 2A. For example, the postPRS messages from each UE may indicate the ToD, and in some implementations the AoD, of the PRS signal broadcast by the UE and may further indicate the ToA, and in some implementations the AoA, of each PRS signal received by the UE. The post-PRS messages may further include, if known, the location of the UE, the orientation of UE, a broadcast indicator of the UE PRS, a reception indicator of PRS of the other UEs, as well as other related measurements, e.g., including map information, the locations of reflectors with respect to the UE, etc.

At stages 6A and 6B, the initiator UE 202 and target UE 204, respectively may determine their ranges and positions, in the same manner as stages 6A and 6B of signaling flow 200 shown in FIG. 2A. For example, the ranges between the UEs may be determined based on the ToD and ToA of the PRS signals broadcast in stage 4 and the positions may be determined based on additional information, such as a known position of the other UE, angle information, and/or ranging and position information with respect to additional UEs.

The explicit indication of cast type in the session initiation message, e.g., prePRS message, shown in stage 1 of FIGS. 2 and 3, may be included in a message field defined in 3GPP standards or at Application-layer standards (SAE, ETSI, CSAE). For example, for 3GPP, the message field may be in the V2X layer or RRC, or the message field may be in Application-layer standards. Table 1 below illustrates, for example, message fields that may be included in a sidelink-based positioning session, including a "cast type indication" that denotes to the target UE 204 that the sidelink-based positioning session will be unicast.

TABLE 1

| Field | Description |
|---|---|
| Ranging Session ID | Initiator-assigned session ID |
| UE Source User Information | Initiator ID |
| Cast Type Indication | Unicast |
| Target UE Information | List of Target UE ID(s) |
| PRS carrier indicator | Carrier for PRS transmission |
| PRS format | Comb, # Symbols, TDM/FDM |
| PRS periodicity | PRS periodicity. Referenced from Initiator prePRS |
| PRS periodicity duration | Time duration for periodic PRS |
| Initiator PRS broadcast time | Initiator UE earliest PRS Tx time |
| PRSresponse required | Yes/No |
| Security | V2X-layer security-specific fields (TBD) |

The cast type indication may be left blank if the cast type is not unicast or may explicitly indicate the non-unicast cast type, e.g., broadcast or groupcast.

Figure 4:
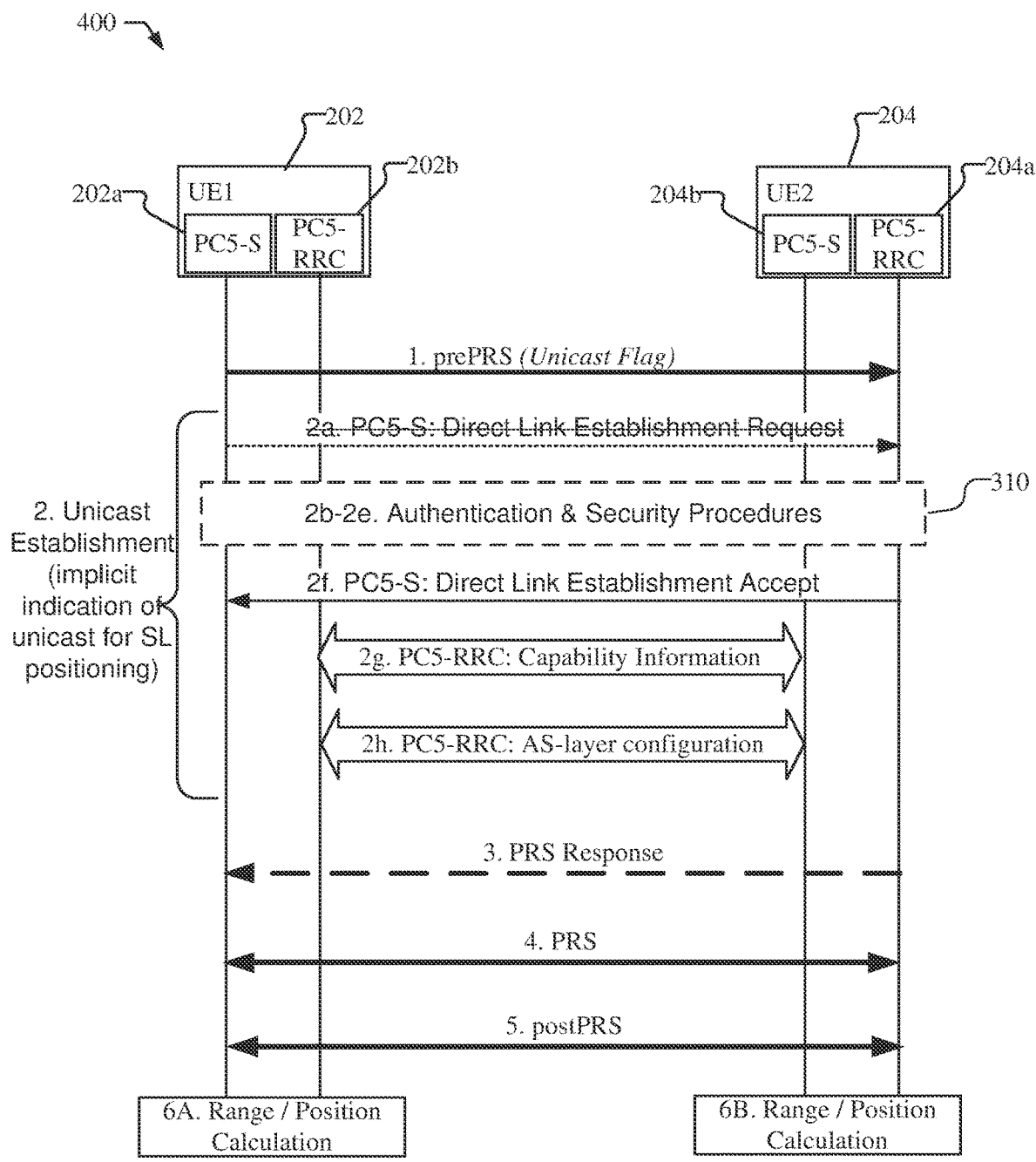
FIG. 4 illustrates a signaling flow between two UEs for sidelink positioning with an implicit indication of unicast link session establishment using broadcast NR PC5-S.

FIG. 4, by way of example, illustrates a signaling flow 400 between two UEs, e.g., the initiator UE 202 and a target UE 204, for sidelink positioning using broadcast NR PC5-S. Signaling flow 400 is similar to the signaling flows 300 and 200 shown in FIGS. 3 and 2 and illustrates an implicit indication of unicast link session establishment. Signaling flow 400 does not illustrate the discovery process 210 shown in FIG. 2A, which may be included in some implementations. The initiator UE 202 and the target UE 204 may be, e.g., any of UEs 102, 104, 110, and 112 shown in FIG. 1, or other wireless devices. As illustrated, the initiator UE 202 includes a chipset for PC5-S 202a and PC5-RRC 202b, and the target UE 204 includes a chipset for PC5-S 204a and PC5-RRC 204b.

At stage 1, the initiator UE 202 may broadcast via PC5-S a first message (prePRS) to initiate the sidelink positioning procedure. The prePRS message, for example, may request a positioning session with target UE 204. The prePRS message of stage 1 of signaling flow 400 may be the same as the prePRS message of stage 1 of signaling flow 200 shown in FIG. 2A. For example, the prePRS message may include identifiers of responder UEs included in the ranging session (e.g., obtained from preceding capabilities messages (not shown)), as well as signal information to be used in the ranging session by the initiator UE 202 and in some implementations by the target UE 204, such as PRS resources, including PRS bandwidth or channel and timing instances, and PRS identifier (ID). The prePRS message in stage 1 of FIG. 4 may not include an explicit indication of the cast type. However, in some implementations, the initiator UE 202 may optionally (as illustrated by italics) include an indication that the sidelink positioning session will be unicast, such as a "Unicast Session" flag in the session initiation message.

Stage 2 illustrates the unicast session establishment, which provides the implicit indication that the sidelink positioning session will be unicast. Stage 2 of signaling flow 400 may be the same or similar to stage 2 of signaling flow 300 shown in FIG. 3 or stage 2 of signaling flow 200 shown in FIG. 2A. For example, stage 2 may include messages sent via PC5-S(stages 2a(optionally) and 2b-2f) and message exchanges sent via PC5-RRC (stage 2g and 2h). As illustrated in FIG. 4 by dotted lines and strikethrough, a direct link establishment request message of stage 2a may not be sent by the initiator UE 202 during the unicast session establishment process as it unnecessary with the transmission of prePRS over PC5-S. The omission of the direct link establishment request message reduces the message count resulting in reduced session establishment time. The remainder of the messages in stage 2, including the messages from stages 2b-2e in the Authentication & Security Procedures of block 310, the direct link establishment accept message from stage 2f and the capability information message exchange of stage 2g and the AS-layer configuration message exchange of stage 2h may be the same as discussed in reference to FIG. 3.

Moreover, stages 3-6a and 6b may be the same as discussed in reference to FIG. 3.

Figure 5:
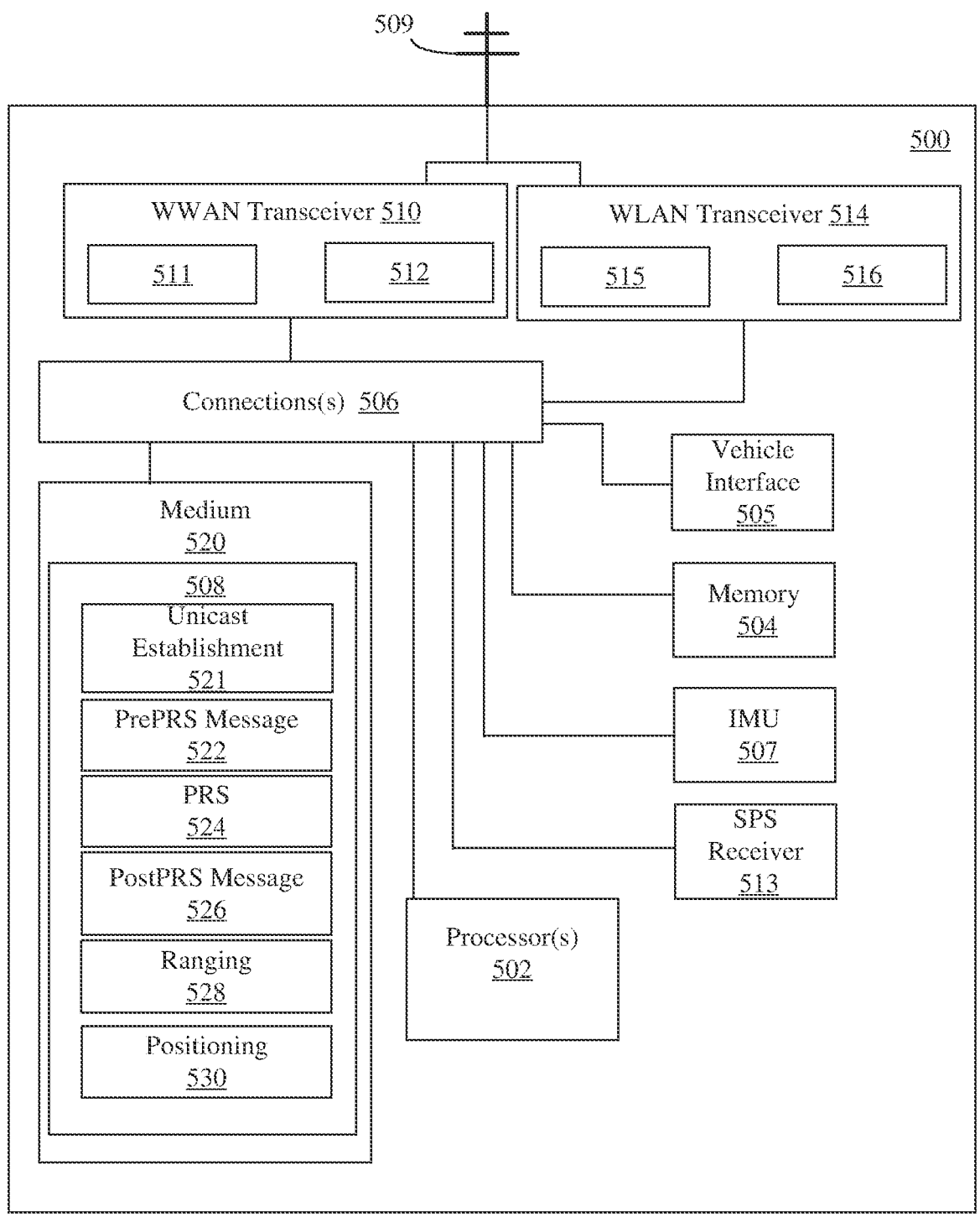
FIG. 5 shows a schematic block diagram illustrating certain exemplary features of a UE configured to support sidelink-based positioning with a unicast link session.

FIG. 5 shows a schematic block diagram illustrating certain exemplary features of a user equipment (UE) 500, which may be any of UEs 102 or 104, 110, or 112, illustrated in FIG. 1 or initiator UE 202 or target UE 204 in FIG. 2A, 2B, 3, or 4. The UE 500 may be configured to act as an initiator UE or a target UE in a unicast sidelink-based positioning session, as discussed herein. If the UE 500 is an OBU, it may be configured to control the automated driving of a vehicle, e.g., vehicle 102. For example, the UE 500 may include a vehicle interface 505 with which commands are provided to the vehicle for automated driving and sensory input, including speed and acceleration, may be provided from the vehicle to UE 500. The UE 500 may, for example, include one or more processors 502, memory 504, an inertial measurement unit (IMU) 507 that may include, e.g., an accelerometer, gyroscope, magnetometers, etc., which may be used to detect orientation with respect to a global or local reference frame and the motion or one or more motion characteristics of the vehicle, a satellite positioning system (SPS) receiver 513 to determine, e.g., a GPS position, and an external interface including, e.g., a Wireless Wide Area Network (WWAN) transceiver 510, and a Wireless Local Area Network (WLAN) transceiver 514, which may be operatively coupled with one or more connections 506 (e.g., buses, lines, fibers, links, etc.) to non-transitory computer readable medium 520 and memory 504. The UE 500 may further include additional items, which are not shown, such as a user interface that may include e.g., a display, a keypad or other input device, such as virtual keypad on the display, through which a user may interface with the user device. In certain example implementations, all or part of UE 500 may take the form of a chipset, and/or the like.

Transceiver 510 may be, e.g., a cellular transceiver, that is configured to transmit and receive direct communications in the wireless network, as illustrated in FIG. 1. The transceiver 510 may include a transmitter 511 enabled to transmit one or more signals over one or more types of wireless communication networks and a receiver 512 to receive one or more signals transmitted over the one or more types of wireless communication networks. Transceiver 514 may be, e.g., a short-range transceiver, and may be configured to transmit and receive direct communications in the wireless network, as illustrated in FIG. 1. The transceiver 514 may include a transmitter 515 enabled to transmit one or more signals over one or more types of wireless communication networks and a receiver 516 to receive one or more signals transmitted over the one or more types of wireless communication networks. The transceivers 510 and 514 may be enabled to transmit one or more signals, including ranging signals (PRS signals) and pre-ranging (prePRS) and post-ranging (postPRS) messages, and unicast link session establishment messages, and to combine and separate messages, over one or more types of wireless communication networks and to receive one or more signals, e.g., including PRS and prePRS and postPRS messages, unicast link session establishment messages and to combine and separate messages, transmitted over the one or more types of wireless communication networks. The transceivers 510 and 514 enable the UE 500 to communicate with transportation entities using D2D communication links, such as DSRC, C-V2X, or 5G NR.

In some embodiments, UE 500 may include antenna 509, which may be internal or external. The antenna 509 may be used to transmit and/or receive signals processed by transceiver 510 and/or transceiver 514. In some embodiments, antenna 509 may be coupled to transceiver 510 and/or transceiver 514. In some embodiments, measurements of signals received (transmitted) by UE 500 may be performed at the point of connection of the antenna 509 and transceiver 510 and/or transceiver 514. For example, the measurement point of reference for received (transmitted) RF signal measurements may be an input (output) terminal of the receivers 512, 516 (transmitters 511, 515) and an output (input) terminal of the antenna 509. In a UE 500 with multiple antennas 509 or antenna arrays, the antenna connector may be viewed as a virtual point representing the aggregate output (input) of multiple antennas. The phase difference of received signals at multiple antennas or antenna array may be used to determine the AoA of the signal with respect to the antenna array, which may be converted to a local or global reference frame based on a known orientation of the UE 500, e.g., based on the orientation of the UE 500 to the global or local reference frame as measured by the IMU 507.

The one or more processors 502 may be implemented using a combination of hardware, firmware, and software. For example, the one or more processors 502 may be configured to perform the functions discussed herein by implementing one or more instructions or program code 508 on a non-transitory computer readable medium, such as medium 520 and/or memory 504. In some embodiments, the one or more processors 502 may represent one or more circuits configurable to perform at least a portion of a data signal computing procedure or process related to the operation of UE 500.

The medium 520 and/or memory 504 may store instructions or program code 508 that contain executable code or software instructions that when executed by the one or more processors 502 cause the one or more processors 502 to operate as a special purpose computer programmed to perform the techniques disclosed herein. As illustrated in UE 500, the medium 520 and/or memory 504 may include one or more components or modules that may be implemented by the one or more processors 502 to perform the methodologies described herein. While the components or modules are illustrated as software in medium 520 that is executable by the one or more processors 502, it should be understood that the components or modules may be stored in memory 504 or may be dedicated hardware either in the one or more processors 502 or off the processors.

A number of software modules and data tables may reside in the medium 520 and/or memory 504 and be utilized by the one or more processors 502 in order to manage both communications and the functionality described herein. It should be appreciated that the organization of the contents of the medium 520 and/or memory 504 as shown in UE 500 is merely exemplary, and as such the functionality of the modules and/or data structures may be combined, separated, and/or be structured in different ways depending upon the implementation of the UE 500.

The medium 520 and/or memory 504 may include a unicast establishment module 521 that when implemented by the one or more processors 502 configures the one or more processors 502 to send and receive messages to establish a unicast link session, including one or more of direct link establishment request and/or accept messages (e.g., illustrated at stages 2a and 2f in FIGS. 3 and 4), Authentication & Security procedures (illustrated at stages 2b-2e in FIGS. 3 and 4), and other message exchanges, such as the capability information message exchange and the AS-layer configuration message exchange (illustrated as stages 2g 2h in FIGS. 3 and 4), via transceiver 510 or 514. The one or more processors 502 may be configured to send or receive an explicit indication that a sidelink positioning session will have a unicast cast type, such as the direct link establishment request message, or an implicit indication that a sidelink positioning session will have a unicast cast type, such as by sending or receiving a message for Authentication & Security procedures for the unicast-link establishment, e.g., after receiving a sidelink positioning initiation message. In some implementations, the one or more processors 502 may be configured to not send direct link establishment request message during the establishment of a unicast link session.

The medium 520 and/or memory 504 may include a prePRS message module 522 that when implemented by the one or more processors 502 configures the one or more processors 502 to generate and transmit or receive pre-ranging messages to initiate or accept a sidelink-based positioning session, such as prePRS messages, via the transceiver 510 or 514. The prePRS messages may be broadcast, multicast, or unicast (with RRC connection). In some implementations, the prePRS messages may be transmitted and received over a licensed spectrum. The prePRS message may be an initiating prePRS message to initiate a sidelink positioning session or a responding prePRS message to acknowledge an initiating sidelink positioning message. The initiating prePRS message may include an explicit indication that the sidelink positioning session will be a unicast session. The initiating prePRS message may include identifiers for the initiator UE and one or more target UEs for the positioning session, and indicate the positioning signal resources for participating UEs, including a time and bandwidth of the positioning (PRS) signals. The prePRS request message may further include PRS ID, session ID, etc.

The medium 520 and/or memory 504 may include a PRS module 524 that when implemented by the one or more processors 502 configures the one or more processors 502 to transmit and receive a positioning signal to and from other UEs in the sidelink positioning session, via the transceiver 510 or 514, e.g., using the PRS resources indicated in the prePRS request message from the initiator UE. The positioning signal, for example, may be a PRS signal, such as a Quadrature Phase Shift Keying (QPSK) modulated pseudo-noise (PN) sequence. The positioning signal may be unicast at the assigned bandwidth, at the assigned time and with the PRS identifier assigned in the prePRS request message. The positioning signal may be unicast and received over a licensed spectrum or an unlicensed spectrum pursuant to category 2 or category 4 LBT constraints. The one or more processors 502, for example, may be configured to measure the ToD of broadcast positioning signals and the ToA of received positioning signals, and may be configured to measure the AoD of positioning signals and the AoA of received positioning signals.

The medium 520 and/or memory 504 may include a postPRS message module 526 that when implemented by the one or more processors 502 configures the one or more processors 502 to send and receive post-ranging messages to and from other UEs in the positioning session, via the transceiver 510 or 514, as discussed herein. The postPRS messages that may include, e.g., an indication of the ToD, and in some implementations the AoD, of the positioning signals and an indication of the ToA, and in some implementations the AoA, of the received positioning signals. In some implementation, the indication of the ToD and ToA may be a difference between the ToD and ToA. In some implementations, the postPRS messages may include an indication of the position of the UE, e.g., if the UE is an anchor UE used for positioning another UE, or other information, such as angle related information for the transmitted and/or received positioning signals.

The medium 520 and/or memory 504 may include a ranging module 528 that when implemented by the one or more processors 502 configures the one or more processors 502 to determine a range to other UEs based on the ToD and ToA of broadcast and received positioning signals as measured by the UE 500 and received in the postPRS messages from other UEs.

The medium 520 and/or memory 504 may include a positioning module 530 that when implemented by the one or more processors 502 configures the one or more processors 502 to determine a position for the UE 500, e.g., based on one or more ranges to UEs and their location information using multilateration or other appropriate techniques discussed herein. For example, the one or more processors 502 may implement a Kalman filter or Extended Kalman filter to determine the position of the UE 500.

The methodologies described herein may be implemented by various means depending upon the application. For example, these methodologies may be implemented in hardware, firmware, software, or any combination thereof. For a hardware implementation, the one or more processors 502 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 520 or memory 504 that is connected to and executed by the one or more processors 502. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 508 on a non-transitory computer readable medium, such as medium 520 and/or memory 504. Examples include computer readable media encoded with a data structure and computer readable media encoded with a computer program code 508. For example, the non-transitory computer readable medium including program code 508 stored thereon may include program code 508 to support unicast type sidelink based positioning session, in a manner consistent with disclosed embodiments. Non-transitory computer readable medium 520 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 508 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 520, instructions and/or data may be provided as signals on transmission media included in a communication apparatus. For example, a communication apparatus may include a transceiver 510 having signals indicative of instructions and data. The instructions and data are configured to cause one or more processors to implement the functions outlined in the claims. That is, the communication apparatus includes transmission media with signals indicative of information to perform disclosed functions.

Memory 504 may represent any data storage mechanism. Memory 504 may include, for example, a primary memory and/or a secondary memory. Primary memory may include, for example, a random-access memory, read only memory, etc. While illustrated in this example as being separate from one or more processors 502, it should be understood that all or part of a primary memory may be provided within or otherwise co-located/coupled with the one or more processors 502. Secondary memory may include, for example, the same or similar type of memory as primary memory and/or one or more data storage devices or systems, such as, for example, a disk drive, an optical disc drive, a tape drive, a solid-state memory drive, etc.

In certain implementations, secondary memory may be operatively receptive of, or otherwise configurable to couple to a non-transitory computer readable medium 520. As such, in certain example implementations, the methods and/or apparatuses presented herein may take the form in whole or part of a computer readable medium 520 that may include computer implementable program code 508 stored thereon, which if executed by one or more processors 502 may be operatively enabled to perform all or portions of the example operations as described herein. Computer readable medium 520 may be a part of memory 504.

Figure 6:
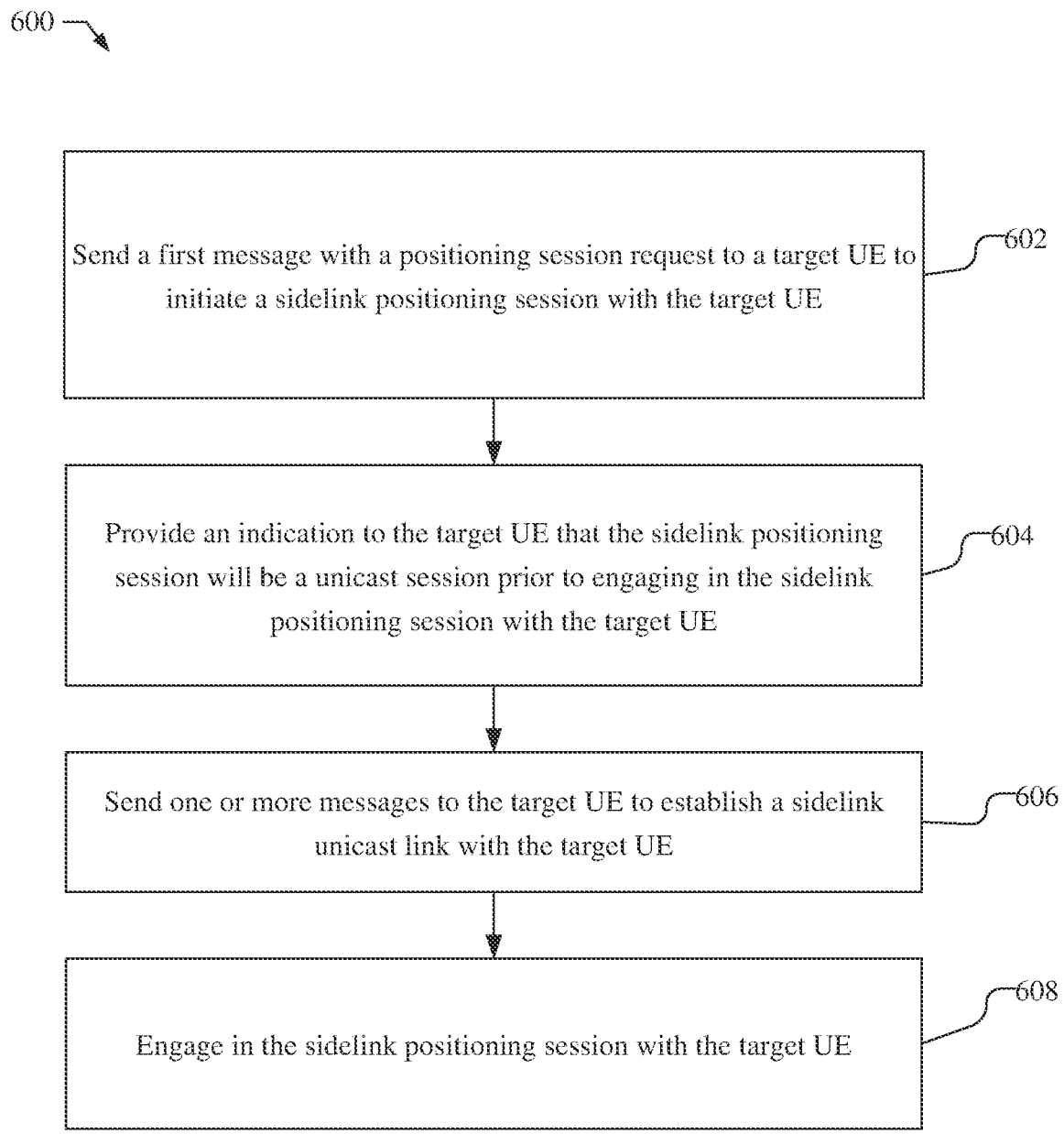
FIG. 6 is a flow chart illustrating a method of sidelink-based positioning between UEs implemented by an initiator UE.

FIG. 6 is a flow chart 600 illustrating a method of sidelink positioning performed by an initiator UE in a distributed system of UEs. The initiator UE, for example, may be the UE 102 in FIG. 1, initiator UE 202 in FIG. 2A, 2B, 3, 4, or UE 500 in FIG. 5.

At block 602, the initiator UE may send a first message with a positioning session request to a target UE to initiate a sidelink positioning session with the target UE, e.g., as discussed in stage 1 of FIGS. 2A, 3, and 4. A means for sending a first message with a positioning session request to a target UE to initiate a sidelink positioning session with the target UE may be, e.g., the transceiver 510 or 514 and the one or more processors 502 with dedicated hardware or implementing executable code or software instructions in memory 504 and/or medium 520, such as the prePRS message module 522.

At block 604, the initiator UE may provide an indication to the target UE that the sidelink positioning session will be a unicast session prior to engaging in the sidelink positioning session with the target UE, e.g., as discussed in stages 1 or 2 of FIGS. 2A, 3, and 4. A means for providing an indication to the target UE that the sidelink positioning session will be a unicast session prior to engaging in the sidelink positioning session with the target UE may be, e.g., the transceiver 510 or 514 and the one or more processors 502 with dedicated hardware or implementing executable code or software instructions in memory 504 and/or medium 520, such as the prePRS message module 522 or unicast establishment module 521 of UE 500.

At block 606, the initiator UE may send one or more messages to the target UE to establish a sidelink unicast link with the target UE, e.g., as discussed in stages 1 or 2 of FIGS. 2A, 3, and 4. A means for sending one or more messages to the target UE to establish a sidelink unicast link with the target UE may be, e.g., the transceiver 510 or 514 and the one or more processors 502 with dedicated hardware or implementing executable code or software instructions in memory 504 and/or medium 520, such as the unicast establishment module 521 of UE 500.

At block 608, the initiator UE may engage in the sidelink positioning session with the target UE, e.g., as discussed in stages 1 or 2 of FIGS. 2A, 3, and 4. A means for engaging in the sidelink positioning session with the target UE may be, e.g., the transceiver 510 or 514 and the one or more processors 502 with dedicated hardware or implementing executable code or software instructions in memory 504 and/or medium 520, such as the PRS module 524, postPRS message module 526, ranging module 528, and positioning module 530 of UE 500.

In some implementations, the indication that the sidelink positioning session will be the unicast session may be a second message that includes an indication of unicast for sidelink positioning, e.g., as discussed in stage 2 of FIGS. 2A, 3, and 4.

In some implementations, the indication that the sidelink positioning session will be the unicast session comprises an indication of unicast for sidelink positioning included in the first message, e.g., as discussed in stage 1 of FIGS. 2A, 3, and 4. For example, the indication of unicast for sidelink positioning may be in a message field in the first message, e.g., as discussed in stage 1 of FIGS. 2A, 3, and 4 and in reference to Table 1.

In some implementations, the initiator UE may provide the indication to the target UE that the sidelink positioning session will be the unicast session by sending a second message to the target UE to initiate an authentication and security procedure as one of the one or more messages sent to the target UE to establish the sidelink unicast link, e.g., as discussed in stage 2 of FIGS. 2A, 3, and 4. In some implementations, the second message to initiate the authentication and security procedure is a direct link authentication request, e.g., as discussed in stage 2b of FIGS. 3 and 4. In some implementations, a direct link establishment request is not sent to the target UE as one of the one or more messages sent to the target UE to establish the sidelink unicast link, e.g., as discussed in stage 2 of FIG. 2A and stage 2a of FIGS. 3 and 4. A means for providing the indication to the target UE that the sidelink positioning session will be the unicast session by sending a second message to the target UE to initiate an authentication and security procedure as one of the one or more messages sent to the target UE to establish the sidelink unicast link may be, e.g., the transceiver 510 or 514 and the one or more processors 502 with dedicated hardware or implementing executable code or software instructions in memory 504 and/or medium 520, such as the unicast establishment module 521 of UE 500.

Figure 7:
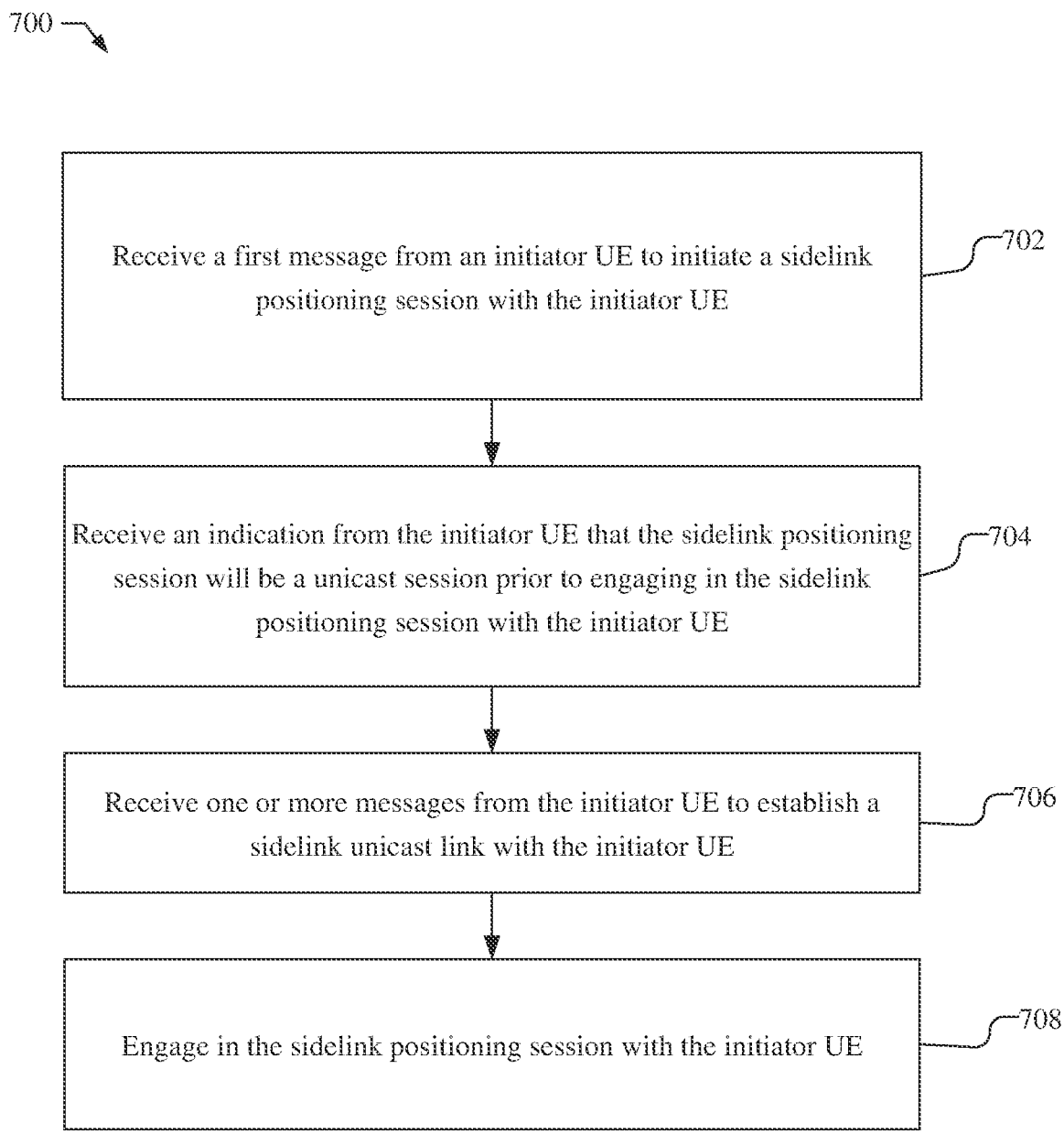
FIG. 7 is a flow chart illustrating a method of sidelink-based positioning between UEs implemented by a responder UE.

FIG. 7 is a flow chart 700 illustrating a method of sidelink positioning performed by a target UE in a distributed system of UEs. The target UE, for example, may be the UE 104 in FIG. 1, target UE 204 in FIG. 2A, 2B, 3, 4, or UE 500 in FIG. 5.

At block 702, the target UE receives a first message from an initiator UE to initiate a sidelink positioning session with the initiator UE, e.g., as discussed in stage 1 of FIGS. 2A, 3, and 4. A means for receiving a first message from an initiator UE to initiate a sidelink positioning session with the initiator UE may be, e.g., the transceiver 510 or 514 and the one or more processors 502 with dedicated hardware or implementing executable code or software instructions in memory 504 and/or medium 520, such as the prePRS message module 522.

At block 704, the target UE may receive an indication from the initiator UE that the sidelink positioning session will be a unicast session prior to engaging in the sidelink positioning session with the initiator UE, e.g., as discussed in stages 1 or 2 of FIGS. 2A, 3, and 4. A means for receiving an indication from the initiator UE that the sidelink positioning session will be a unicast session prior to engaging in the sidelink positioning session with the initiator UE may be, e.g., the transceiver 510 or 514 and the one or more processors 502 with dedicated hardware or implementing executable code or software instructions in memory 504 and/or medium 520, such as the prePRS message module 522 or unicast establishment module 521 of UE 500.

At block 706, the target UE may receive one or more messages from the initiator UE to establish a sidelink unicast link with the initiator UE, e.g., as discussed in stages 1 or 2 of FIGS. 2A, 3, and 4. A means for receiving one or more messages from the initiator UE to establish a sidelink unicast link with the initiator UE may be, e.g., the transceiver 510 or 514 and the one or more processors 502 with dedicated hardware or implementing executable code or software instructions in memory 504 and/or medium 520, such as the unicast establishment module 521 of UE 500

At block 708, the target UE may engage in the sidelink positioning session with the initiator UE, e.g., as discussed in stages 1 or 2 of FIGS. 2A, 3, and 4. A means for engaging in the sidelink positioning session with the initiator UE may be, e.g., the transceiver 510 or 514 and the one or more processors 502 with dedicated hardware or implementing executable code or software instructions in memory 504 and/or medium 520, such as the PRS module 524, postPRS message module 526, ranging module 528, and positioning module 530 of UE 500

In some implementations, the indication that the sidelink positioning session will be the unicast session may be a second message that includes an indication of unicast for sidelink positioning, e.g., as discussed in stage 2 of FIGS. 2A, 3, and 4.

In some implementations, the indication that the sidelink positioning session will be the unicast session comprises an indication of unicast for sidelink positioning included in the first message, e.g., as discussed in stage 1 of FIGS. 2A, 3, and 4. For example, the indication of unicast for sidelink positioning may be in a message field in the first message, e.g., as discussed in stage 1 of FIGS. 2A, 3, and 4 and in reference to Table 1.

In some implementations, receiving the indication from the initiator UE that the sidelink positioning session will be the unicast session may comprise receiving a second message from the initiator UE to initiate an authentication and security procedure as one of the one or more messages received from the initiator UE to establish the sidelink unicast link, e.g., as discussed in stage 2 of FIGS. 2A, 3, and 4. In some implementations, the second message to initiate the authentication and security procedure is a direct link authentication request, e.g., as discussed in stage 2b of FIGS. 3 and 4. In some implementations, a direct link establishment request is not sent to the target UE as one of the one or more messages sent to the target UE to establish the sidelink unicast link, e.g., as discussed in stage 2 of FIG. 2A and stage 2a of FIGS. 3 and 4. A means for receiving the indication from the initiator UE that the sidelink positioning session will be the unicast session comprises receiving a second message from the initiator UE to initiate an authentication and security procedure as one of the one or more messages received from the initiator UE to establish the sidelink unicast link may be, e.g., the transceiver 510 or 514 and the one or more processors 502 with dedicated hardware or implementing executable code or software instructions in memory 504 and/or medium 520, such as the unicast establishment module 521 of UE 500.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses.

Clause 1. A method of sidelink positioning performed by an initiator user equipment (UE), the method comprising: sending a first message with a positioning session request to a target UE to initiate a sidelink positioning session with the target UE; providing an indication to the target UE that the sidelink positioning session will be a unicast session prior to engaging in the sidelink positioning session with the target UE; sending one or more messages to the target UE to establish a sidelink unicast link with the target UE; and engaging in the sidelink positioning session with the target UE.

Clause 2. The method of clause 1, wherein the indication that the sidelink positioning session will be the unicast session comprises a second message that includes an indication of unicast for sidelink positioning.

Clause 3. The method of clause 1, wherein the indication that the sidelink positioning session will be the unicast session comprises an indication of unicast for sidelink positioning included in the first message.

Clause 4. The method of clause 3, wherein the indication of unicast for sidelink positioning is in a message field in the first message.

Clause 5. The method of clause 1, wherein providing the indication to the target UE that the sidelink positioning session will be the unicast session comprises sending a second message to the target UE to initiate an authentication and security procedure as one of the one or more messages sent to the target UE to establish the sidelink unicast link.

Clause 6. The method of clause 5, wherein the second message to initiate the authentication and security procedure comprises a direct link authentication request.

Clause 7. The method of clause 5, wherein a direct link establishment request is not sent to the target UE as one of the one or more messages sent to the target UE to establish the sidelink unicast link.

Clause 8. An initiator user equipment (UE) configured for sidelink positioning, comprising: a wireless transceiver configured to wirelessly communicate with entities in a wireless network; at least one memory; and at least one processor coupled to the wireless transceiver and the at least one memory, wherein the at least one processor is configured to: send, via the wireless transceiver, a first message with a positioning session request to a target UE to initiate a sidelink positioning session with the target UE; provide an indication to the target UE that the sidelink positioning session will be a unicast session prior to engaging in the sidelink positioning session with the target UE; send, via the wireless transceiver, one or more messages to the target UE to establish a sidelink unicast link with the target UE; and engage in the sidelink positioning session with the target UE.

Clause 9. The initiator UE of clause 8, wherein the indication that the sidelink positioning session will be the unicast session comprises a second message that includes an indication of unicast for sidelink positioning.

Clause 10. The initiator UE of clause 8, wherein the indication that the sidelink positioning session will be the unicast session comprises an indication of unicast for sidelink positioning included in the first message.

Clause 11. The initiator UE of clause 10, wherein the indication of unicast for sidelink positioning is in a message field in the first message.

Clause 12. The initiator UE of clause 8, wherein the at least one processor is configured to provide the indication to the target UE that the sidelink positioning session will be the unicast session by being configured to send, via the wireless transceiver, a second message to the target UE to initiate an authentication and security procedure as one of the one or more messages sent to the target UE to establish the sidelink unicast link.

Clause 13. The initiator UE of clause 12, wherein the second message to initiate the authentication and security procedure comprises a direct link authentication request.

Clause 14. The initiator UE of clause 12, wherein a direct link establishment request is not sent to the target UE as one of the one or more messages sent to the target UE to establish the sidelink unicast link.

Clause 15. An initiator user equipment (UE) configured for sidelink positioning, comprising: means for sending a first message with a positioning session request to a target UE to initiate a sidelink positioning session with the target UE; means for providing an indication to the target UE that the sidelink positioning session will be a unicast session prior to engaging in the sidelink positioning session with the target UE; means for sending one or more messages to the target UE to establish a sidelink unicast link with the target UE; and means for engaging in the sidelink positioning session with the target UE.

Clause 16. The initiator UE of clause 15, wherein the indication that the sidelink positioning session will be the unicast session comprises a second message that includes an indication of unicast for sidelink positioning.

Clause 17. The initiator UE of clause 15, wherein the indication that the sidelink positioning session will be the unicast session comprises an indication of unicast for sidelink positioning included in the first message.

Clause 18. The initiator UE of clause 17, wherein the indication of unicast for sidelink positioning is in a message field in the first message.

Clause 19. The initiator UE of clause 15, wherein the means for providing the indication to the target UE that the sidelink positioning session will be the unicast session comprises means for sending a second message to the target UE to initiate an authentication and security procedure as one of the one or more messages sent to the target UE to establish the sidelink unicast link.

Clause 20. The initiator UE of clause 19, wherein the second message to initiate the authentication and security procedure comprises a direct link authentication request.

Clause 21. The initiator UE of clause 19, wherein a direct link establishment request is not sent to the target UE as one of the one or more messages sent to the target UE to establish the sidelink unicast link.

Clause 22. A non-transitory storage medium including program code stored thereon, the program code is operable to configure at least one processor in an initiator user equipment (UE) for sidelink positioning, the program code comprising instructions to: send a first message with a positioning session request to a target UE to initiate a sidelink positioning session with the target UE; provide an indication to the target UE that the sidelink positioning session will be a unicast session prior to engaging in the sidelink positioning session with the target UE; send one or more messages to the target UE to establish a sidelink unicast link with the target UE; and engage in the sidelink positioning session with the target UE.

Clause 23. The non-transitory storage medium of clause 22, wherein the indication that the sidelink positioning session will be the unicast session comprises a second message that includes an indication of unicast for sidelink positioning.

Clause 24. The non-transitory storage medium of clause 22, wherein the indication that the sidelink positioning session will be the unicast session comprises an indication of unicast for sidelink positioning included in the first message.

Clause 25. The non-transitory storage medium of clause 24, wherein the indication of unicast for sidelink positioning is in a message field in the first message.

Clause 26. The non-transitory storage medium of clause 22, wherein the program code comprising instructions to provide the indication to the target UE that the sidelink positioning session will be the unicast session further comprise instructions to send a second message to the target UE to initiate an authentication and security procedure as one of the one or more messages sent to the target UE to establish the sidelink unicast link.

Clause 27. The non-transitory storage medium of clause 26, wherein the second message to initiate the authentication and security procedure comprises a direct link authentication request.

Clause 28. The non-transitory storage medium of clause 26, wherein a direct link establishment request is not sent to the target UE as one of the one or more messages sent to the target UE to establish the sidelink unicast link.

Clause 29. A method of sidelink positioning performed by a target user equipment (UE), the method comprising: receiving a first message from an initiator UE to initiate a sidelink positioning session with the initiator UE; receiving an indication from the initiator UE that the sidelink positioning session will be a unicast session prior to engaging in the sidelink positioning session with the initiator UE; receiving one or more messages from the initiator UE to establish a sidelink unicast link with the initiator UE; and engaging in the sidelink positioning session with the initiator UE.

Clause 30. The method of clause 29, wherein the indication that the sidelink positioning session will be the unicast session comprises a second message that includes an indication of unicast for sidelink positioning.

Clause 31. The method of clause 29, wherein the indication that the sidelink positioning session will be the unicast session comprises an indication of unicast for sidelink positioning included in the first message.

Clause 32. The method of clause 31, wherein the indication of unicast for sidelink positioning is in a message field in the first message.

Clause 33. The method of clause 29, wherein receiving the indication from the initiator UE that the sidelink positioning session will be the unicast session comprises receiving a second message from the initiator UE to initiate an authentication and security procedure as one of the one or more messages received from the initiator UE to establish the sidelink unicast link.

Clause 34. The method of clause 33, wherein the second message to initiate the authentication and security procedure comprises a direct link authentication request.

Clause 35. The method of clause 33, wherein a direct link establishment request is not received from the initiator UE as one of the one or more messages received from the initiator UE to establish the sidelink unicast link.

Clause 36. A target user equipment (UE) configured for sidelink positioning, comprising: a wireless transceiver configured to wirelessly communicate with entities in a wireless network; at least one memory; and at least one processor coupled to the wireless transceiver and the at least one memory, wherein the at least one processor is configured to: receive, via the wireless transceiver, a first message from an initiator UE to initiate a sidelink positioning session with the initiator UE; receive an indication from the initiator UE that the sidelink positioning session will be a unicast session prior to engaging in the sidelink positioning session with the initiator UE; receive, via the wireless transceiver, one or more messages from the initiator UE to establish a sidelink unicast link with the initiator UE; and engage in the sidelink positioning session with the initiator UE.

Clause 37. The target UE of clause 36, wherein the indication that the sidelink positioning session will be the unicast session comprises a second message that includes an indication of unicast for sidelink positioning.

Clause 38. The target UE of clause 36, wherein the indication that the sidelink positioning session will be the unicast session comprises an indication of unicast for sidelink positioning included in the first message.

Clause 39. The target UE of clause 38, wherein the indication of unicast for sidelink positioning is in a message field in the first message.

Clause 40. The target UE of clause 36, wherein the at least one processor is configured to receive the indication from the initiator UE that the sidelink positioning session will be the unicast session by being configured to receive, via the wireless transceiver, a second message from the initiator UE to initiate an authentication and security procedure as one of the one or more messages received from the initiator UE to establish the sidelink unicast link.

Clause 41. The target UE of clause 40, wherein the second message to initiate the authentication and security procedure comprises a direct link authentication request.

Clause 42. The target UE of clause 40, wherein a direct link establishment request is not received from the initiator UE as one of the one or more messages received from the initiator UE to establish the sidelink unicast link.

Clause 43. A target user equipment (UE) configured for sidelink positioning, comprising: means for receiving a first message from an initiator UE to initiate a sidelink positioning session with the initiator UE; means for receiving an indication from the initiator UE that the sidelink positioning session will be a unicast session prior to engaging in the sidelink positioning session with the initiator UE; means for receiving one or more messages from the initiator UE to establish a sidelink unicast link with the initiator UE; and means for engaging in the sidelink positioning session with the initiator UE.

Clause 44. The target UE of clause 43, wherein the indication that the sidelink positioning session will be the unicast session comprises a second message that includes an indication of unicast for sidelink positioning.

Clause 45. The target UE of clause 43, wherein the indication that the sidelink positioning session will be the unicast session comprises an indication of unicast for sidelink positioning included in the first message.

Clause 46. The target UE of clause 45, wherein the indication of unicast for sidelink positioning is in a message field in the first message.

Clause 47. The target UE of clause 43, wherein the means for receiving the indication from the initiator UE that the sidelink positioning session will be the unicast session comprises means for receiving a second message from the initiator UE to initiate an authentication and security procedure as one of the one or more messages received from the initiator UE to establish the sidelink unicast link.

Clause 48. The target UE of clause 47, wherein the second message to initiate the authentication and security procedure comprises a direct link authentication request.

Clause 49. The target UE of clause 47, wherein a direct link establishment request is not received from the initiator UE as one of the one or more messages received from the initiator UE to establish the sidelink unicast link.

Clause 50. A non-transitory storage medium including program code stored thereon, the program code is operable to configure at least one processor in target user equipment (UE) for sidelink positioning, the program code comprising instructions to: receive a first message from an initiator UE to initiate a sidelink positioning session with the initiator UE; receive an indication from the initiator UE that the sidelink positioning session will be a unicast session prior to engaging in the sidelink positioning session with the initiator UE; receive one or more messages from the initiator UE to establish a sidelink unicast link with the initiator UE; and engage in the sidelink positioning session with the initiator UE.

Clause 51. The non-transitory storage medium of clause 50, wherein the indication that the sidelink positioning session will be the unicast session comprises a second message that includes an indication of unicast for sidelink positioning.

Clause 52. The non-transitory storage medium of clause 50, wherein the indication that the sidelink positioning session will be the unicast session comprises an indication of unicast for sidelink positioning included in the first message.

Clause 53. The non-transitory storage medium of clause 52, wherein the indication of unicast for sidelink positioning is in a message field in the first message.

Clause 54. The non-transitory storage medium of clause 50, wherein the program code comprising instructions to receive the indication from the initiator UE that the sidelink positioning session will be the unicast session further comprises instructions to receive a second message from the initiator UE to initiate an authentication and security procedure as one of the one or more messages received from the initiator UE to establish the sidelink unicast link.

Clause 55. The non-transitory storage medium of clause 54, wherein the second message to initiate the authentication and security procedure comprises a direct link authentication request.

Clause 56. The non-transitory storage medium of clause 54, wherein a direct link establishment request is not received from the initiator UE as one of the one or more messages received from the initiator UE to establish the sidelink unicast link.

Therefore, it is intended that claimed subject matter not be limited to the particular examples disclosed, but that such claimed subject matter may also include all aspects falling within the scope of appended claims, and equivalents thereof.

What is claimed is:

1. A method of sidelink positioning performed by an initiator user equipment (UE), the method comprising:
   sending a first message with a positioning session request to a target UE to initiate a sidelink positioning session with the target UE;
   providing an indication to the target UE that the sidelink positioning session will be a unicast session prior to engaging in the sidelink positioning session with the target UE;
   sending, based on the indication, one or more messages to the target UE to establish a sidelink unicast link with the target UE; and
   engaging in the sidelink positioning session with the target UE based on the established sidelink unicast link.

2. The method of claim 1, wherein the indication that the sidelink positioning session will be the unicast session comprises a second message that includes an indication of unicast for sidelink positioning.

3. The method of claim 1, wherein the indication that the sidelink positioning session will be the unicast session comprises an indication of unicast for sidelink positioning included in the first message.

4. The method of claim 3, wherein the indication of unicast for sidelink positioning is in a message field in the first message.

5. The method of claim 1, wherein providing the indication to the target UE that the sidelink positioning session will be the unicast session comprises sending a second message to the target UE to initiate an authentication and security procedure as one of the one or more messages sent to the target UE to establish the sidelink unicast link.

6. The method of claim 5, wherein the second message to initiate the authentication and security procedure comprises a direct link authentication request.

7. The method of claim 5, wherein a direct link establishment request is not sent to the target UE as one of the one or more messages sent to the target UE to establish the sidelink unicast link.

8. An initiator user equipment (UE) configured for sidelink positioning, comprising:
   a wireless transceiver configured to wirelessly communicate with entities in a wireless network;
   at least one memory; and
   at least one processor coupled to the wireless transceiver and the at least one memory, wherein the at least one processor is configured to:
       send, via the wireless transceiver, a first message with a positioning session request to a target UE to initiate a sidelink positioning session with the target UE;
       provide an indication to the target UE that the sidelink positioning session will be a unicast session prior to engaging in the sidelink positioning session with the target UE;
       send, based on the indication and via the wireless transceiver, one or more messages to the target UE to establish a sidelink unicast link with the target UE; and
       engage in the sidelink positioning session with the target UE based on the established sidelink unicast link.

9. The initiator UE of claim 8, wherein the indication that the sidelink positioning session will be the unicast session comprises a second message that includes an indication of unicast for sidelink positioning.

10. The initiator UE of claim 8, wherein the indication that the sidelink positioning session will be the unicast session comprises an indication of unicast for sidelink positioning included in the first message.

11. The initiator UE of claim 10, wherein the indication of unicast for sidelink positioning is in a message field in the first message.

12. The initiator UE of claim 8, wherein the at least one processor is configured to provide the indication to the target UE that the sidelink positioning session will be the unicast session by being configured to send, via the wireless transceiver, a second message to the target UE to initiate an authentication and security procedure as one of the one or more messages sent to the target UE to establish the sidelink unicast link.

13. The initiator UE of claim 12, wherein the second message to initiate the authentication and security procedure comprises a direct link authentication request.

14. The initiator UE of claim 12, wherein a direct link establishment request is not sent to the target UE as one of the one or more messages sent to the target UE to establish the sidelink unicast link.

15. A method of sidelink positioning performed by a target user equipment (UE), the method comprising:
   receiving a first message from an initiator UE to initiate a sidelink positioning session with the initiator UE;
   receiving an indication from the initiator UE that the sidelink positioning session will be a unicast session prior to engaging in the sidelink positioning session with the initiator UE;
   receiving, based on the indication, one or more messages from the initiator UE to establish a sidelink unicast link with the initiator UE; and
   engaging in the sidelink positioning session with the initiator UE based on the established sidelink unicast link.

16. The method of claim 15, wherein the indication that the sidelink positioning session will be the unicast session comprises a second message that includes an indication of unicast for sidelink positioning.

17. The method of claim 15, wherein the indication that the sidelink positioning session will be the unicast session comprises an indication of unicast for sidelink positioning included in the first message.

18. The method of claim 17, wherein the indication of unicast for sidelink positioning is in a message field in the first message.

19. The method of claim 15, wherein receiving the indication from the initiator UE that the sidelink positioning session will be the unicast session comprises receiving a second message from the initiator UE to initiate an authentication and security procedure as one of the one or more messages received from the initiator UE to establish the sidelink unicast link.

20. The method of claim 19, wherein the second message to initiate the authentication and security procedure comprises a direct link authentication request.

21. The method of claim 19, wherein a direct link establishment request is not received from the initiator UE as one of the one or more messages received from the initiator UE to establish the sidelink unicast link.

22. A target user equipment (UE) configured for sidelink positioning, comprising:
  a wireless transceiver configured to wirelessly communicate with entities in a wireless network;
  at least one memory; and
  at least one processor coupled to the wireless transceiver and the at least one memory, wherein the at least one processor is configured to:
  receive, via the wireless transceiver, a first message from an initiator UE to initiate a sidelink positioning session with the initiator UE;
  receive an indication from the initiator UE that the sidelink positioning session will be a unicast session prior to engaging in the sidelink positioning session with the initiator UE;
  receive, based on the indication and via the wireless transceiver, one or more messages from the initiator UE to establish a sidelink unicast link with the initiator UE; and
  engage in the sidelink positioning session with the initiator UE based on the established sidelink unicast link.

23. The target UE of claim 22, wherein the indication that the sidelink positioning session will be the unicast session comprises a second message that includes an indication of unicast for sidelink positioning.

24. The target UE of claim 22, wherein the indication that the sidelink positioning session will be the unicast session comprises an indication of unicast for sidelink positioning included in the first message.

25. The target UE of claim 24, wherein the indication of unicast for sidelink positioning is in a message field in the first message.

26. The target UE of claim 22, wherein the at least one processor is configured to receive the indication from the initiator UE that the sidelink positioning session will be the unicast session by being configured to receive, via the wireless transceiver, a second message from the initiator UE to initiate an authentication and security procedure as one of the one or more messages received from the initiator UE to establish the sidelink unicast link.

27. The target UE of claim 26, wherein the second message to initiate the authentication and security procedure comprises a direct link authentication request.

28. The target UE of claim 26, wherein a direct link establishment request is not received from the initiator UE as one of the one or more messages received from the initiator UE to establish the sidelink unicast link.

* * * * *